United States Patent Office 3,398,209
Patented Aug. 20, 1968

3,398,209
PREPARATION OF TRANS-1,4-DIENES
Wolfgang Schneider, Broadview Heights, Ohio, assignor to The B. F. Goodrich Company, New York, N.Y., a corporation of New York
No Drawing. Filed July 6, 1965, Ser. No. 469,849
9 Claims. (Cl. 260—680)

ABSTRACT OF THE DISCLOSURE

Trans-1,4-dienes which are useful third monomers for polymerization with ethylene and propylene to form vulcanizable rubbers are obtained by the reaction of a 1,3-diene containing 4 to 6 carbon atoms with ethylene. The reaction is conducted in the presence of a reduced palladium catalyst.

---

This invention relates to an improved method for preparing trans-1,4-dienes.

1,4-hexadiene is used as a third monomer in preparing vulcanizable rubbers of ethylene and propylene terpolymers. In preparing 1,4-hexadiene by known methods, a mixture of cis- and trans-isomers is obtained. It is desirable to have an all trans-1,4-hexadiene available for preparing certain vulcanizable ethylene-propylene rubbers. At present, trans-1,4-hexadiene is an expensive monomer since it first must be separated from the cis-isomer and the cis-isomer then discarded, which represents a loss of costly raw materials.

This invention provides an economical method for readily preparing 1,4-hexadiene, methyl-1,4-hexadienes and 1,4-heptadiene of predominately trans-structure in high yields to the exclusion of the cis-structure, which comprises reacting a 1,3-diene such as butadiene, isoprene or piperylene with ethylene in the presence of a catalyst which is formed by reacting together a reducible palladium compound with an aluminum alkyl halide reducing agent. Even more improved results are obtained if an organic compound which is an electron donor in this reaction for the transition metal is also used, which compounds are described hereinafter.

The reducible palladium compound may be any compound of palladium which is readily reduced by an aluminum alkyl halide compound. Useful palladium compounds include the chloride, bromide, sulfate, hydroxide, nitrate, oxalate and other salts of inorganic and organic acids. Organic compounds useful in the process are palladium chelates in which the palladium is attached to two functional groups of a molecule by a main valence bond and coordinately; for example, palladium acetylacetonate. The palladium compounds are preferably used in an anhydrous state.

The reducing agents used include aluminum alkyl halides having the formula $R_xAlX_y$ wherein R is an alkyl group containing 1 to 12 carbon atoms, preferably 2 to 8, X is a halogen atom, and $x$ is 1 or 2, $y$ is 1 or 2, and $x+y=3$. Typical compounds include diethyl aluminum chloride, dibutyl aluminum chloride, ethyl aluminum dichloride, propyl aluminum dichloride, diisobutyl aluminum chloride; mixtures thereof; and the so-called alkyl aluminum sesquihalides, all of which are well-known.

The electron donors suitable for use in the invention include compounds which contain linking electron pairs, such as organic compounds of an element of groups VA and VI–A of the Periodic Table including nitrogen, phosphorous, arsenic, antimony, sulfur, and oxygen. A preferred group of compounds of group VA are those containing nitrogen or phosphorous present in the compound in a trivalent state and which contain alkyl or aryl radicals and which may contain other substituents in an ortho, para, or meta position to the carbon-nitrogen or carbon-phosphorous bridge. Typical compounds are triphenyl phosphine, triphenyl phosphite, triphenyl stibine, triethylamine, triphenylamine, trimethylene diamine, triethylene diamine, pyridine, piperidine, morpholine acrylonitrile, benzonitrile and acetamide. A useful group of compounds containing VI–A elements are diphenyl ether, diphenylsulfone, butadiene cyclic sulfone and isoprene cyclic sulfone. Another group of electron donors which may be used in the process of invention include aromatic halogen compounds including chlorobenzene, dichlorobenzene, ortho- and meta-chlorobenzonitrile and 2,4,6-trichloroaniline. Preferred are: alkyl amines containing 2 to 12 carbon atoms; particularly polyalkylene polyamines or trialkylene diamines which contain 2 to 10 carbon atoms; morpholine; acrylonitrile and benzonitrile.

In the preparation of the catalyst, the palladium compound and reducing agent are reacted together in the presence of a 1,3-diene. The electron donor may be added during this reaction or thereafter. Suitable 1,3-dienes are butadiene-1,3, isoprene, piperylene; also cyclooctadiene-1,5; and the like.

The reaction may be conducted over a wide range of temperatures and pressures. Normally, the reaction is conducted at a temperature above room temperature, that is, about 25° C. to temperatures as high as about 250° C. More preferably, the reactions are conducted at temperatures in a range of about 50° C. to 150° C. At higher temperatures, the catalyst tends to decompose, and undesirable by-products are formed.

The reaction may be carried out at atmospheric pressure, but usually is at higher pressure. This is determined by the vapor pressure of the 1,3-diene and the solubility of ethylene in the 1,3-diene at that temperature and pressure. The pressure of the reactor may range from about 100 p.s.i.g. to about 5,000 p.s.i.g. and more normally at pressures of about 200 p.s.i.g. to about 1,000 p.s.i.g., more preferably less than 1,000 p.s.i.g. as 500 p.s.i.g. if no solvent is present.

The molar ratio of reactants include from about $10^{-1}$ to $10^{-8}$, preferably $10^{-3}$ to $10^{-5}$ mols of palladium per mol of 1,3-diene, 1 mol of palladium to 1 and 10 mol equivalents of reducing compound and 0.1 to 10 mols of electron donor per mol of pallidium, preferably 0.25 to 2 mols per mol of palladium.

It is convenient to carry out the process without a solvent. If solvents are desired, suitable solvents include aliphatic, cycloaliphatic and aromatic hydrocarbons, such as hexane, heptane, cyclooctane, benzene, hydrocarbon mixture of petroleums boiling between 60 and 200° C. Purified anhydrous starting materials and solvents are employed.

EXAMPLE I 2 grams (11 millimols) of palladium chloride and 1.45 grams (5.5 millimols) of triphenyl phosphine were suspended in 3 quarts of butadiene-1,3 which was then cooled to —10° C. and 9 cc. of diethyl aluminum chloride was added thereto. This catalyst solution was then charged to a rocking 3 liter autoclave. Ethylene was charged to obtain a pressure of 150 p.s.i.g. at room temperature and the reactor was then heated and maintained at 60° C. for 48 hours. During the reaction, the pressure of ethylene held at 500 p.s.i.g. The reactor was vented and about one gallon of product was recovered. This product contained 42% trans-1,4-hexadiene and some 2,4-hexadiene. The trans-1,4-hexadiene was isolated by distillation and the product had a purity of 99%.

EXAMPLE II 0.71 gram (4 millimols) of palladium chloride and 0.1 gram (2 millimols) of triphenyl phosphine were stirred into 150 cc. of isoprene which was then cooled to —10° C. and 3 cc. of diethyl aluminum chloride was added thereto.

This mixture was then charged to an autoclave. 48 grams of ethylene was added at room temperature and the reactor heated to 55° C. for 60 hours. 30% conversion of isoprene was obtained with a yield of 55% 4-methyl-1-trans-4-hexadiene.

EXAMPLE III 0.159 gram (0.25 millimol) of palladium acetylacetonate and 0.66 gram (0.25 millimol) of triphenyl phosphine were stirred into 150 cc. of isoprene which was then cooled to −10° C. and 1 cc. of diethyl aluminum chloride was added thereto. This mixture was then charged to an autoclave. 43 grams of ethylene was added at room temperature and the reactor heated to 55° C. for 60 hours. 30% conversion of isoprene was obtained with a yield of 55% of 4-methyl-trans-1,4-hexadiene.

EXAMPLE IV 0.159 gram (0.25 millimol) of palladium acetylacetonate and 0.68 gram (0.25 millimol) of triphenyl phosphine were stirred into 150 cc. of butadiene-1,3 which was then cooled to −10° C. and 1 cc. of diethyl aluminum chloride was added thereto. This mixture was then charged to an autoclave. 43 grams of ethylene was added at room temperature and the reactor heated to 55° C. for 60 hours. 80% conversion of butadiene was obtained with a yield of 90% of trans-1,4-hexadiene.

When these examples are repeated with other electron donors including diphenylsulfone, triethylene diamine, triphenylstibine, triethylamine, morpholine, benzonitrile, chlorobenzene; and with other reducing compounds including ethyl aluminum sequichloride, and butyl aluminum dichloride; and piperylene, good yields of the trans-1,4-dienes are obtained, to the substantial exclusion of cis-1,4-dienes. When other group VIII metals are used in this reaction, trans-1,4-dienes are not obtained. For example, iron compounds give cis-1,4-dienes and polymers are mainly obtained with cobalt compounds.

The trans-1,4-dienes polymerize readily with ethylene and propylene to form vulcanizable products. One commercial and economic advantage of this process is that polymerization grade butadiene-1,3 and isoprene are not required. For example, streams from ethylene cracking units which contain conjugated dienes may be used in preparing the trans-1,4-dienes containing 6 to 8 carbon atoms.

I claim:

1. The method for preparing trans-1,4-dienes which comprises reacting conjugated dienes containing 4 to 6 carbon atoms with ethylene in the presence of a catalyst comprising palladium in a reduced state prepared by reacting together a compound of palladium and an aluminum alkyl halide reducing agent.

2. The method for preparing trans-1,4-dienes which comprises reacting butadiene, isoprene or piperylene with ethylene in the presence of a catalyst comprising a salt of palladium reacted with an aluminum alkyl halide having the formula $R_xAlX_y$, wherein R is an alkyl group containing 1 to 12 carbon atoms, X is a halogen atom, $x$ is 1 or 2, $y$ is 1 or 2, and $x+y=3$, and an organic compound of elements of groups VA and VI–A.

3. A method for preparing trans-1,4-dienes which comprises reacting butadiene-1,3, isoprene or piperylene with ethylene in the presence of a catalyst comprising the reaction product of a palladium salt in a concentration in the catalyst of from $10^{-3}$ to $10^{-5}$ mols of palladium per mol of butadiene-1,3, isoprene or piperylene, 1 to 10 mol equivalents of an alkyl aluminum compound having the formula $R_xAlX_y$, wherein R is an alkyl group containing 1 to 12 carbon atoms, X is a halogen atom, $x$ is 1 or 2, $y$ is 1 or 2, and $x+y=3$, per mol of palladium, and 0.1 to 10 mols of an organic compound of nitrogen containing 2 to 12 carbon atoms per mol of palladium.

4. The method of claim 2 wherein the palladium salt is palladium acetylacetonate, the aluminum alkyl halide has the formula $R_xAlX_y$ and the VA organic compound is selected from the group consisting of triphenyl phosphine, triphenyl phosphite, triphenyl stibine, triethylamine, triphenylamine, trimethylene diamine, triethylene diamine, triethylene diamine, pyridine, piperidine, morpholine, acrylonitrile, benzonitrile, and acetamide.

5. A method for preparing trans-1,4-dienes which comprises reacting butadiene-1,3, isoprene or piperylene with ethylene in the presence of a catalyst comprising a salt of palladium reacted with an alkyl aluminum chloride and benzonitrile.

6. A method for preparing trans-1,4-dienes which comprises reacting butadiene-1,3, isoprene or piperylene with ethylene in the presence of a catalyst comprising a salt of palladium reacted with an alkyl aluminum chloride and triethylamine.

7. The method of claim 2 wherein the palladium compound is palladium acetylacetonate, the aluminum alkyl halide has the formula $R_xAlX_y$ and the organic compound is selected from the group consisting of diphenyl ether, diphenyl sulfone, chlorobenzenes, chlorobenzonitrile, and trichloroaniline.

8. The method for preparing trans-1,4-hexadienes which comprises reacting butadiene-1,3 or isoprene with ethylene in the presence of a catalyst comprising a palladium salt in a concentration of from $10^{-3}$ to $10^{-5}$ mols of palladium per mol of butadiene-1,3 or isoprene, 1 to 10 mol equivalents of an alkyl aluminum compound having the formula $R_xAlX_y$, wherein R is an alkyl radical containing 2 to 8 carbon atoms, X is a halogen atom, $x$ is 1 or 2, $y$ is 1 or 2, and $x+y=3$, per mol of palladium and 0.1 to 10 mols of an organic nitrogen compound selected from the group consisting of morpholine, benzonitrile, acrylonitrile and trialkylene diamines wherein the alkylene groups contain 2 to 4 carbon atoms.

9. The method of claim 8 wherein the palladium compound is palladium acetylacetonate and the reducing agent is diethyl aluminum chloride and the organic nitrogen compound is a trialkylene diamine wherein the alkylene groups contain 2 to 4 carbon atoms.

References Cited

UNITED STATES PATENTS

| | | | |
|---|---|---|---|
| 3,152,195 | 10/1964 | Verbanc | 260—680 |
| 3,306,948 | 2/1967 | Kealy | 260—680 |

FOREIGN PATENTS

| | | |
|---|---|---|
| 651,596 | 2/1965 | Belgium. |
| 691,770 | 8/1964 | Canada. |

PAUL M. COUGHLAN, JR., *Primary Examiner.*